US000001293H

United States Statutory Invention Registration [19]

[11] Reg. Number: H1293

Carlon

[43] Published: Mar. 1, 1994

[54] CONTACT HAZARD MONITOR

[75] Inventor: Hugh R. Carlon, Fallston, Md.

[73] Assignee: The United States of America as represented by the Secretary of the Army, Washington, D.C.

[21] Appl. No.: 999,345

[22] Filed: Dec. 31, 1992

[51] Int. Cl.[5] ..... G01N 30/00

[52] U.S. Cl. ..... 73/23.2; 73/31.02; 73/31.03

*Primary Examiner*—Bernarr E. Gregory

*Attorney, Agent, or Firm*—Anthony T. Lane; Michael Sachs; Edward Goldberg

[57] ABSTRACT

A surface contaminated with toxic materials to be tested or monitored is sampled using a probe which is shown here to have a rectangular opening typically of several square inches in cross section. A pliable gasket of suitable heat-resistant material is used to cushion and seal the probe in contact with the surface, but small holes are provided of sufficient size (and positioned close to the surface to be tested) to allow ambient air to be drawn at a desired volumetric flow rate through a sampling tube which also forms the handle of the probe, and is connected through a flexible tube or hose to a suitable detector and vacuum pump. The detector and pump can be combined in a single unit. The detector can be one of several kinds of providing sensitive monitoring of agent vapors or simulant vapors, e.g., a flame photometer or a gas chromatograph (with suitable sampling techniques). Within the probe is mounted a lamp that provides intense heat (e.g., a quartz tube lamp) and is mounted in such a position that it is close to the surface when the probe gasket is in contact with the surface. A polished reflector can be used to focus the radiation uniformly across the surface. In place of the lamp other heating elements could be used, e.g., wound wire elements of Nichrome or other material, or electrically-conductive rods of semiconductors or carbon or other materials.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTACT HAZARD MONITOR

GOVERNMENTAL INTEREST

The invention described herein may be manufactured, used, and licensed by or for the Government for governmental purposes without the payment to us of any royalty thereon.

FIELD OF USE

The invention relates to a contact hazard monitor and a method of using the same.

BACKGROUND

"Contact Hazard" from chemical agents can be defined in many ways depending upon specific scenarios. But in general, as applied to the hazard to human beings whose skin comes into contact with a surface that has previously been subjected to contamination by liquid agents such as nerve agents and mustard, it is defined as follows.

If a surface, e.g., paint on a substrate, that has previously been exposed to liquid agent, either is wiped so that no visible liquid remains, or is allowed to "weather" (stand undisturbed) until the surface appears to be completely dry, then contact hazard is that of the sorbed agent on and in the surface to humans touching or otherwise coming into direct contact with the surface.

Thus it is important to be able to detect the presence of agent residuals, and hence, hazards to humans, from surfaces in previously contaminated environments. Wiping the surfaces with detector paper will not work because sorbed agents will not be removed. Chemical analysis would require scraping, e.g., of paint samples followed by wet chemical procedures using trained personnel.

SUMMARY OF INVENTION

A simple and direct means of detecting the sorbed contamination would seem to be that of drawing vapor through a probe placed near a surface. Vapors arising from the surface would be entrained with ambient air and thus carried through a sampling tube to a detector, where simple vapor analysis using a flame or other detector scheme should give a continuous indication of the agent vapor evolution, and thus of the residual contamination sorbed by the surface and its potential contact hazard. Warming the surface should help, since agent vapor pressure obviously should increase with temperature, and hence the vapor flux from the surface should increase as well.

Unfortunately, this is not the case. Experiments have repeatedly shown that there is no correlation between measured vapor evolution from a surface and the hazard presented by that surface to humans directly contacting it. The reasons for this are many and complex; at the very least they include unquantifiable factors such as partitioning coefficients between the surfaces and human skin (which vary with contact pressure, moisture, etc.) and diffusion of sorbed agent through substrates, paints and other materials.

THE PROBLEM

The problem to be solved thus appears to be simple but, in reality, has defied solution until the present. A method and apparatus are needed urgently such that nondestructive testing of suspected surfaces can be carried out quickly and a reliable measurement of total sorbed contamination on and in the surface can be made to assess contact hazard to humans. While vapor evolution at ambient or even warm temperatures cannot be relied upon to indicate contact hazard for the reasons outlined above, a quick measurement of all (99%+) contamination present is directly correlatable to contact hazard.

THE SOLUTION

Fortunately, a great deal has been learned in recent years concerning the behavior of liquid chemical agents on and in surfaces, and their evaporation vs. temperature. Such data are reported not only for agents VX (O-ethyl, S-2-(diisopropylamino)ethyl methylphosphonothioate), thickened GD (TGD) (O-pinacolyl methylphosphonofluoridate), and thickened distilled mustard (THD) (bis-(2-chloroethyl)-sulfide), but for their test simulants in recent reports. It has been learned that surface temperature is the only critical parameter in the evaporation of sorbed agents form surfaces, regardless of how the surface is heated (e.g., hot air or infrared radiation). Furthermore, when the surface temperature reaches approximately 250 degrees F. (121 degrees C.), all sorbed agent evaporates within a few seconds such that a residual contamination of only about one percent or less remains. That is, 99%+ of all sorbed agents can be evaporated and sampled within a few seconds of reaching the required surface temperature (in practice, only VS requires a surface temperature as high as 250 degrees F.; TGD and THD behave the same way at still lower surface temperatures.

It is this discovery that underlies my invention of the method and apparatus that are the subjects of this patent disclosure.

BRIEF DESCRIPTION OF THE FIGURE

The invention will be better understood by reference to the FIGURE herein wherein the preferred embodiment of the present invention is illustrated.

The FIGURE is a schematic illustration of a preferred embodiment of the apparatus of the present invention.

PREFERRED EMBODIMENT

Figure 1:
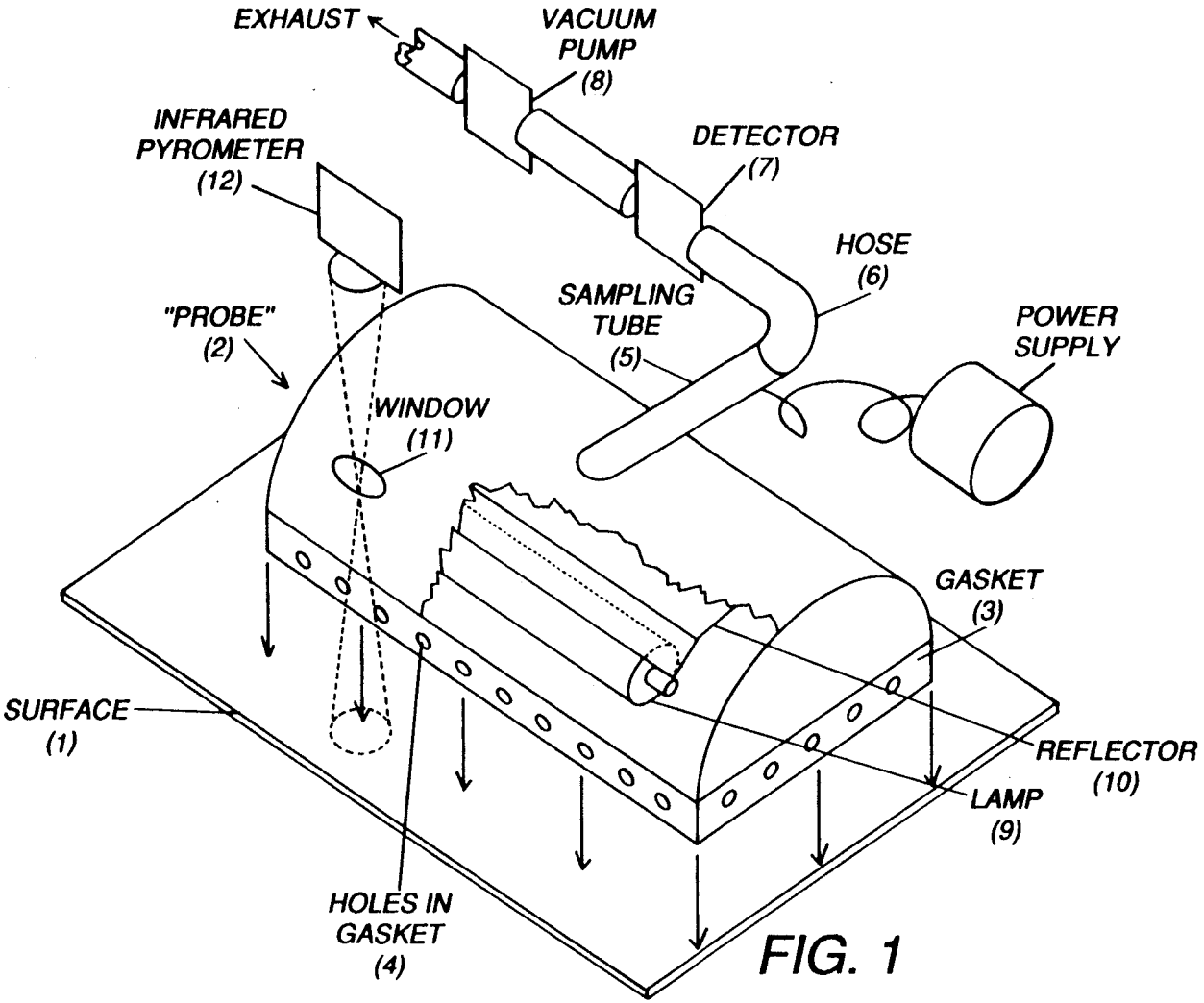

In the FIGURE, the surface to be tested or monitored (1) is sampled using a probe (2) which is shown here to have a rectangular opening typically of several square inches in cross section. The base can have a multitude of shapes with the objects being to cover the contaminated area. A pliable gasket (3) of suitable heat-resistant material is used to cushion and seal the probe in contact with the surface, but small holes (4) are provided of sufficient size (and positioned close to the surface to be tested) to allow ambient air to be drawn at a desired volumetric flow rate through a sampling tube (5) which also forms the handle of the probe, and is connected through a flexible tube or hose (6) to a suitable detector (7) and vacuum pump (8). The detector (7) and pump (8) can be combined in a single unit. The detector can be one of several kinds providing sensitive monitoring of agent vapors or simulant vapors, e.g., a flame photometer or a gas chromatograph (with suitable sampling techniques).

Within the probe (2) is mounted a lamp (9) that provides intense heat (e.g., a quartz tube lamp) and is mounted in such a position that it is close to the surface (1) when the probe gasket (3) is in contact with the surface. A polished reflector (10) can be used to focus the radiation uniformly across the surface. In place of the lamp (9) other heating elements could be used, e.g., wound wire elements of Nichrome or other materials, or electrically-conductive rods of semiconductors or carbon or other materials.

A window (11) is provided on the top of the probe in such a position that the surface can be observed through it. This is a desirable but optional feature because it is possible to otherwise determine proper operation of the apparatus by methods described below. An optional infrared pyrometer (12) is mounted in such a position that its optics are focused through the window (11) and on the surface to be tested, so that temperature of the surface itself can be monitored during heating to ensure that a reading of 250 degrees F. or more is obtained. The pyrometer is calibrated against standard surfaces since there have varying infrared emissivities and accurate temperature readings are sought.

Optionally, an infrared pyrometer need not be used if a suitable contact surface temperature indicator is available (pretested for accurate surface temperatures), or if the probe has been precalibrated for various surfaces to determine the gas temperatures exiting the probe for the volumetric air sampling rates used, with the probe in place on a surface to be tested. In the latter case, a precision surface temperature indicator (contact or pyrometer type) would be used at a given flow rate to calibrate the true surface temperature and the gas temperature to reach its value noted when the surface reaches 250 degrees F. surface temperature for various sample surfaces. Experiments have shown that painted heavy armor plate requires the most intense heat application of all samples tested, but that the required "critical" surface temperature still can be obtained in less than 10 second of heating time, using suitable heat sources.

The sampling tube (5), and hose (6) if more than a few inches long, are heated to an internal wall temperature of at least 120 degrees F., e.g., by using electrical resistance wire wound about their circumferences and covered with insulating tape. The electrical power required is about 30 watts at ambient temperatures, but is larger when the apparatus is used in colder environments. Power is controlled by a thermostatted regulator. The tube (and hose) walls are heated as a precaution against C-agent condensation upon them following C-agent evaporation from the surface being investigated.

In practice, the apparatus is used in variations of procedures like the following. The surface type is noted, and the probe is placed on a flat part of the surface. The heat source (9) is switched on, and the elapsed time is monitored. Surface temperatures (measured using pyrometer (12), or probe exit gas temperatures (monitored with a thermistor/thermocouple at base of heated tube (5)) are also monitored. Based on direct readings and/or previous calibrations (see above), the heat source (9) is switched off when it is verified that the tue surface temperature has reached at least 250 degrees F.; this can be verified by one or a combination of the following readings; elapsed time; pyrometer temperature (12); exit gas temperature in sampling tube (5). About 99% or more of all sorbed agent on and in the surface will be vaporized during the elapsed heating time. Thus, the detector will integrate the total agent sample that previously presented a contact hazard from the surface, from the surface area covered by the probe (2), and over the elapsed sampling time. The plot thus will show the rate at which the agent vapor left the surface. A mathematical integration of the area under the curve will yield the total agent dosage that was given off by the surface during the elapsed sampling time (typically within ten seconds or less). The sampled surface area will be left "clean," i.e., decontaminated to a level of one percent residual agent or less. The gas output from the vacuum pump (8) should be protectively filtered since it will contain agent vapors. In practice, the operator should also wear respiratory protection (a mask).

In conclusion, while a specific embodiment of the invention has been shown and described in detail to illustrate the application of the principles of the invention, it will be understood that the invention may be embodied otherwise without departing from such principles.

What is claimed is:

1. A contact hazard monitor of a surface contaminated with toxic materials, comprising:
   - a hollow heat producing probe having a base for separable engagement to said surface,
   - a pliable heat resistant gasket attached to said base, said gasket sealing said probe to said surface, said gasket having a plurality of openings for the passage of ambient air,
   - a sampling tube connected to said probe,
   - a detector of said toxic material connected to said sampling tube, and
   - a vacuum pump for drawing said toxic material through said detector from said sampling tube, whereby said toxic material is removed from said surface.

2. The monitor of claim 1 wherein said heat producing of said probe is accomplished by a quartz tube lamp.

3. The monitor of claim 2 wherein a polished reflector within said probe is used to focus the heat of said lamp across said contaminated surface.

4. The monitor of claim 3 wherein an infrared pyrometer measures a temperature of said surface until a temperature of at least 250 degrees F. is attained.

5. A method of monitoring a measured surface contaminated with a toxic agent comprising:
   - placing a heat producing probe over said measured surface.
   - heating said probe,
   - measuring a temperature of said surface by a pyrometer until a temperature of at least 250 degrees F. is attained, and
   - maintaining said temperature for a predetermined time over said measured surface thereby extracting said toxic material.

* * * * *